Patented Mar. 18, 1941

2,235,268

UNITED STATES PATENT OFFICE 2,235,268

POTENTIAL MEASURING APPARATUS

John A. Victoreen, Cleveland Heights, Ohio

Application September 12, 1938, Serial No. 229,493

21 Claims. (Cl. 250—83)

This invention relates to improvements in apparatus for measuring small electrical potentials, and more particularly to apparatus for measuring Roentgen rays.

Although devices have heretofore been designed by which it was the intent and purpose to measure X-radiation, there were many differences in operation and construction of such devices, which it is the purpose of the present invention to overcome.

Heretofore the prior devices have been relatively expensive and delicate instruments and were so unstable in their operation as to be relatively unreliable in their measurements. Furthermore the physical constants of the various parts so varied with the passage of time as to render the operation uncertain and the measurements subject to many inaccuracies. These prior instruments ordinarily necessitated complicated calculation to determine the X-radiation output and made it necessary to utilize separate standards of comparisons to check the operation. Furthermore, these prior instruments were usually not direct reading and they were incapable of being used to shut off the X-ray machine.

By this present invention it is possible to check all of the components of the operating circuit necessary to be checked from within the apparatus itself. This checking can be done quickly and easily without computations. The device is also capable of measuring any predetermined dosage within the range desired. It is also possible to tell by direct reading the quantity of radiation delivered after the machine is turned on. Still further and highly desirable advantage resides in the ability to set the controls so that the X-ray machine delivers a predetermined number of Roentgen units after which the X-ray machine is automatically turned off. Provision is also made to allow for operation of the X-ray machine without the use of the control and measuring devices, without making any complicated and sometimes dangerous circuit changes.

Still other advantages of the invention and the invention itself will become more apparent from the following description of some embodiments of the invention, which description is illustrated by the accompanying drawings and forms a part of this specification.

Figure 1:
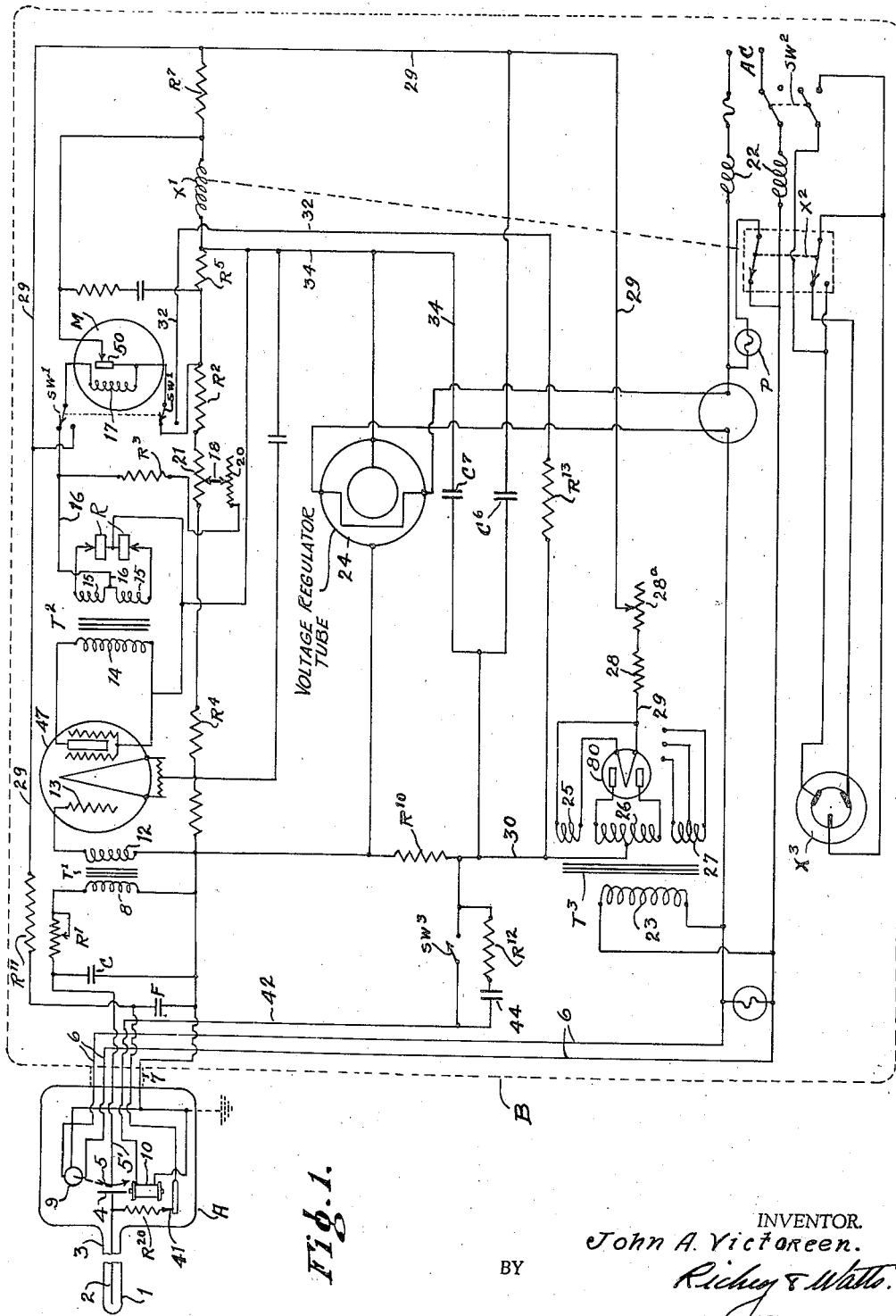
Fig. 1 illustrates diagrammatically a circuit showing the apparatus of my invention.

Briefly, the device comprises an ionization circuit which has an ionization chamber and an electrostatic alternator that may be charged to a predetermined potential; the ionization chamber is adapted to be inserted in the path of X-rays whereby the air within the chamber is ionized which causes the charge to be dissipated. It will also be seen that the circuit may be so arranged that the circuit may be charged instead of discharged should it be desirable. A control circuit is provided which is connected to the ionization circuit and includes a power supply for supplying the desired potentials for operation not only of the control circuit, but the ionization circuit and means whereby the ionization circuit may be charged; this circuit also includes instrumentalities through which the condition of the charge in the ionization circuit may be determined at any time.

In one form of the device it is preferably constructed in two units, one comprising a portable housing for the ionization circuit and its components, which housing is indicated generally at A; and the other comprising a control circuit, indicated at B, disposed in a separate housing and connected to the ionization circuit by a suitable cable. The ionization chamber which is a part of the ionization circuit may thus be placed in close proximity to the patient or the place where the X-rays are to be measured, while the control circuit and the indicated apparatus are disposed at a more remote point which facilitates shielding the operator against the undesirable and possibly harmful effect of the X-rays.

More specifically, the ionization circuit includes an ionization chamber of predetermined volume, the outer wall 1 being composed of a material permeable to X-rays, and which wall is conducting and is at the same time electrically connected to the metallic case which for the purpose of this explanation may be considered as at ground potential. An inner co-axial electrode 2, which extends into the ionization chamber terminates spaced from the end. The ionization chamber is disposed on the end of a tube 3 which is of a length sufficient to permit the ionization chamber to be readily placed at the point of application of the rays. The electrode 2 extends through the tube and is connected to the stator plates 4 of an electrostatic alternator. The electrostatic alternator comprises a condenser having stator plates 4 and rotary plates 5 which are adapted to intermesh and rotate between the stator plates.

The rotary plates 5 of the alternator are driven by a motor 9, the speed of the motor and the design of the condenser determining the frequency of the alternator. A relay 10 is also provided in the ionization unit, adapted to control a switch 41 for charging purposes. The various connections for the ionization circuit are taken through the flexible cable 7 to the control unit as will hereafter more clearly appear.

The rotor plates of the alternator, or output, are coupled to the control circuit by a conduit 5' which passes through a cable 7 to the control circuit, being connected in the input side of the control circuit, to the primary 8 of a step-up transformer $T_1$.

The other end of the primary 8 is connected to the chassis ground as is the housing of the ionization unit and the outer-electrode or chamber wall 1 of the ionization chamber. As previously stated, all the wires from the ionization unit are enclosed in a flexible cable 7 which may be shielded and which is connected to the control unit B. A variable resistance $R_1$ is inserted in the conductor 6 providing a sensitivity control or means for limiting the output of the ionization circuit. The alternator output is coupled to the amplifier input by a tuned circuit which comprises the capacity C disposed across the input of the transformer $T_1$, the capacity being such that the circuit C+8 comprises a tuned circuit, C being supplemented by the capacity of the cable 7, tuned to the output of the alternator. The output of the alternator, as will hereinafter appear, is of an oscillatory nature of approximately 430 cycles per second.

Coupling the alternator to the amplifier by a tuned circuit affords a more efficient transfer of energy from the ionization circuit to the amplifier, which energy would otherwise be greatly reduced by the capacity of the cable. Other advantages of the tuned coupling reside in the fact that the circuit automatically changes its impedance inversely as the frequency of the oscillating circuit changes, due to changes in motor speed because of variations in line voltage, and thus provides constant transmission even though there may be varying frequency. Furthermore, being tuned to the output of the electrometer circuit, it eliminates any unwanted frequencies such as 60 cycle frequencies which might be picked up from the motor 9. Because the motor speed changes, upon changes in line voltage, the filament voltage will also change due to the line voltage change, and the above mentioned network will cause these changes to balance out each other and assist in maintaining the output constant.

The transformer output is connected to the amplifier tube 47, one end of the secondary 12 of the transformer $T_1$ being connected to the control grid 13 and the other end of the secondary being connected to ground as is the primary 8. The output from the tube 47 is connected to the primary 14 of a stepdown transformer $T_2$, the secondary of the transformer being connected to a rectifier R. The secondary 15 of the transformer $T_2$ is of the center tapped type, which center tap 16 is connected by a conductor through one leg of the double pole double throw switch $SW_1$ to the winding 17 of an indicating instrument or meter M. The other end of the winding 17 of the meter is connected through the other leg of the switch $SW_1$ to the resistance $R_2$ which is a part of a resistor network. A resistor $R_3$ is connected to the conductor 16 ahead of the meter and at its other end to a variable resistance 20. A potentiometer type resistance 21 is connected with its resistance in series with the resistor $R_2$ and a resistor $R_4$, the resistor $R_4$ being located with its other end connected to the center of the filament of the tube 47. The movable arms 18 are ganged together in such a manner that one resistance compensates the circuit for the undesirable effects of the other.

Power for operating the device may be obtained from the usual 115 volt A. C. power line indicated at A. C., a switch $SW_2$ being provided to interrupt the circuit when desired. This switch is also provided with an auxiliary blade which automatically closes the circuit to the control take-off $X_3$, which, when the device is operating in conjunction with the X-ray machine may be used to allow operation of the machine when the indicating instrument is cut off. Radio frequency choke coils 22 are interposed in the A. C. line, which line extends to the primary 23 of a power transformer $T_3$. A pilot light P is disposed across the power line and controlled by the switch $X_2$ adapted to be lighted when the X-ray machine is operating under control of the switch $X_2$ and control take-off $X_3$. A voltage regulator tube 24 is disposed with the circuit closing connections in one of the A. C. leads to open the A. C. circuit if the tube is removed. The power transformer may be of the usual type, having separate secondary windings; secondary 25 being the filament winding for the rectifier tube 80; 26 being the winding for the plate supply, and 27 being the winding for the filament supply for the tube 47. The output from the power supply is taken from the filament of the tube 80 and the center tap of the secondary 26 in the usual manner.

Resistors 28 and $28_a$ are disposed in the lead 29 from the filament of the tube 80 for reducing the current which is then conducted by the lead 29 to furnish proper voltages for the device to resistor $R_7$, thence through the winding $X_1$, which is the operating winding for the cut-off switch $X_2$, and then the resistor $R_5$. The lead 30 from the power transformer $T_3$ center tap connects through the resistor $R_{10}$ to the ground end of the before-mentioned resistor network. A filter condenser $C_6$ is provided across the leads 29 and 30 and one $C_7$ from the lead 30 to lead 34 which connects to a point between the relay coil $X_1$ and resistor $R_5$. The voltage regulator tube 24 is connected between the leads 30 and 34 to regulate the voltage for the elements of the tube, as well as the meter regulatting circuit.

The switch $SW_1$ which, as previously stated, is a double pole double throw switch and provides means whereby the meter M may be switched out of the circuit as shown, and connected across the source of potential, being a direct connection to the conductor 29 and to the conductor 30 through the line 32 and resistor $R_{13}$ for test purposes, hereinafter to be described.

Means for charging the ionization circuit is provided and comprises connecting the lead 29, which extends through the filter resistance $R_{11}$ and the cable 7 into the ionization circuit case, to the stator section of the alternator by the relay 10 which closes the contacts 41. Resistance $R_{11}$ and condenser F act as a resistance filter for removing undesirable pulsations from the line 29. A resistance $R_{20}$ is interposed in the line adjacent the stator for purposes later to be described.

The relay 10 obtains its operating potential from across the resistor $R_{10}$ being connected at one end to the chassis and at the other end through the lead 42 to the lead 30. A switch $SW_3$ is provided for manually closing the circuit and is shunted by the spark suppressor comprising the condenser 44 and resistance $R_{12}$ respectively.

The operation of the apparatus is as follows:

The switch $SW_2$ is thrown to the "on" position as shown, which furnishes current for the power supply and also energizes the motor 9 of the electrostatic alternator through the conductors 6 to start the rotor of the alternator which rotates at a speed of approximaely 3200 R. P. M. Each plate of the stator and rotor comprises eight radially spaced segments which thus provides a pulsation of approximately 430 cycles per second. As previously stated, this may vary depending on the speed of the motor and number of segments. The ionization circuit is then charged by closing the switch $SW_3$. Voltage is applied to the relay 10 due to the potential drop across the resistor $R_{10}$. This closes the points 41 allowing full voltage of the power supply, limited by 28 and $28_a$ to be applied to the stator section through the filter circuit comprising the resistance $R_{11}$ and condenser F and through the high resistance $R_{20}$.

With the rotor of the alternator rotating, it would be practically impossible to charge the same to any predetermined amount because of the continuously varying capacity, but with the high resistance $R_{20}$ in the charging line, the circuit may be charged without disturbing its dynamic equilibrium. The charge in the ionization circuit may be 350 volts, although obviously this voltage may be any desired amount. The device shown, although designed to operate by discharging the ionization circuit, may be readily changed for operation by charging through the ionization chamber. Such a device is hereinafter shown and described.

Just prior to the charging of the ionization circuit, the voltage output of the power supply is checked so that the exact voltage of the charging potential may be known. This is necessary because changes in line voltage may vary throughout a period of time. This checking is accomplished by the switch $SW_1$, which is switched to the other terminals shown to shunt the meter across the power supply output, it being directly connected to line 29 and to line 32. The reading on the meter is then noted and if it is low it may be set to the full range of the scale by the adjustable resistance $28_a$. The switch $SW_1$ is returned to the position shown and the ionization circuit charged.

The ionization circuit being charged and the rotor plates of the electrostatic alternator now being rotated in the field built up by the charge, a pulsating current is generated by the alternator which is directly proportional in strength to the strength of the field of the alternator.

This current is amplified by the step-up transformer $T_1$ and tube 47.

The output or plate circuit of the tube 47 is connected to the primary of the step-down transformer $T_2$ where the voltage is reduced and the current increased. The secondary of the transformer is connected to the rectifier 50 which may be of the copper oxide type, of well known construction. The output of the rectifier is connected through the switch $SW_1$ into the meter circuit.

It will thus be seen that the meter is now recording a potential which is a D. C. pulsating potential, and which potential is directly proportional to the intensity of the static charge or field of the ionization circuit over the range of voltages used. The reading on the meter should be the same as that read during the test just made. If it does not read the same, it may be because of changes in tube characteristics or variation in the circuit constants. In either event, the meter is made to read the same as it did for the test by varying the sensitivity control $R_1$ to increase the sensitivity of the circuit if the reading is low, and decrease it if it is high.

The meter is of the depressed zero type. That is, it has to have some current applied to it to register zero; this being desirable because it is necessary to have positive contact of the contacts 50 in the meter, which contacts are connected to indicating arm of the meter and "make" when the meter reaches zero, and to allow a residual current in the ionization circuit which may be considered as a saturation current because if the current drops below 90 volts, the ionization in the chamber is no longer directly proportional to the charge or linear in its discharge; and further because it is desired to have a residual current through the copper oxide rectifier because it does not rectify linearly on small currents. For instance, the meter may require .8 ma. to register zero and 4.8 ma. to register full scale.

The meter may be and preferably is graduated in Roentgens, reading up to 300 Roentgens for full scale. The meter circuit, as will be seen by examination of the drawings, is a bridge circuit with the meter across the bridge. The resistances 20 and 21 may be varied by the arms 18 to make the meter read any amount from maximum to minimum merely by the subtraction or addition of potential by means of the variable resistance in one leg of the circuit, and the circuit is arranged so that the sensitivity of the meter remains constant during this process.

The device is now all set for measuring 300 Roentgens of X-ray dosage. If less than 300 Roentgens is desired, a compensating current is provided by the resistance network without changing the sensitivity of the meter so that the indicator is moved back to the desired position. Sufficient resistance is inserted by the sliders 18 until the hand of the meter registers the desired amount, say 100 Roentgens. The apparatus is now set to measure 100 Roentgens of dosage. It should be noted that the contacts 50 remain open as long as the meter indicator or hand is above zero, but closed when it reaches zero. These contacts open and close the circuit to the coil $X_1$ which is the operating coil for the switch $X_2$. The contacts for the switch $X_2$ remain in the position shown when no current flows in the coil $X_1$ and are switched to their alternate position when the coil is energized, turning off the pilot light and the control take-off $X_3$.

The ionization chamber is now placed in the path of the X-rays and the X-ray machine turned on. The X-rays ionize the air in the ionization chamber which causes the static charge that furnishes the field potential for the alternator to be reduced, the reduction in the charge being determined by the intensity and duration of the radiation. As the field potential is reduced the output of the alternator is reduced, which reduction is reflected in the control circuit and is shown on the indicator of the meter which falls toward zero. After 100 Roentgens have been produced by the X-ray machine, the meter reaches zero, thus causing the contacts 50 to be closed, which closure unbalances the bridge circuit closing the contacts suddenly and firmly. The closure of the contacts causes current to flow from line 29 through resistance R₇, contact points 50, switch SW₁ and to line 34 through resistance R₅. The coil X₁ being energized, the switch X₂ is actuated, which turns off the pilot light P and opens the control circuit to X₃ shutting off the X-ray machine.

Figure 2:
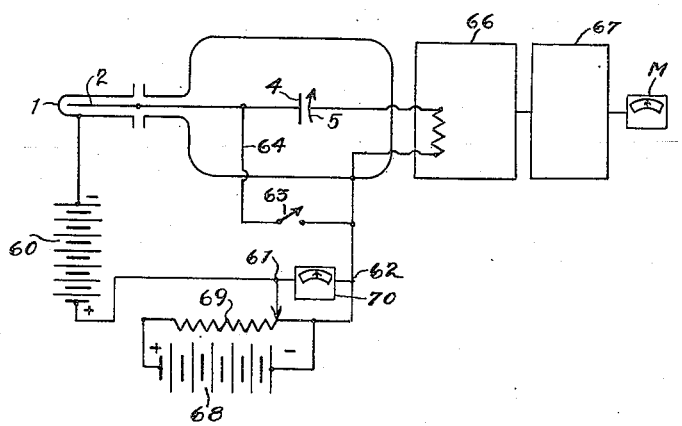
Fig. 2 is a schematic diagram showing a modified form of the invention.
Figure 3:
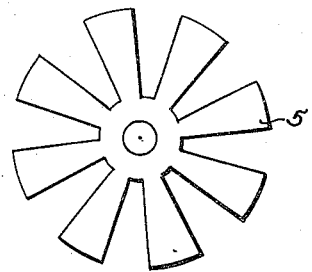
Fig. 3 is a plan view of one of the plates of the electrostatic alternator.

As previously stated, the device, with slightly minor changes can be operated as a null indicator type of instrument and is particularly successful where extreme accuracy is desired as when the device is used as a standard of comparison. This adaptation is shown schematically in Fig. 2.

In this instance the ionization chamber has the outer chamber wall segregated from the remainder of the circuit. This has its advantage in that the ionization chamber may be charged and then removed from the device, placed in the radiation and then replaced in the unit circuit to read the amount of discharge due to the radiation.

The chamber wall is supplied with a source of field potential which may comprise a 90 volt battery 60 with the negative side connected to the ionization chamber wall and the positive side connected through a slider arm 61 and line 62 to the unit casing, and thence through the input of the amplifier circuit to the rotor of the alternator. A shorting switch 63 connects the positive side to the inner electrode by the line 64. The output of the alternator, which has the stator plates 4 connected to the inner electrode 2, is connected to the amplifier 66 and the amplifier output in turn to the rectifier 67. The rectifier 67 is connected to an indicator M. Obviously the rectifier and indicator might be replaced with a single unit that would do the indicating if desirable.

A compensating potential 68 is provided and comprises a voltage source having its negative side connected to the line 62, voltage is taken from the source by the slider 61 which slides on the resistance 69 disposed across voltage source 68. The slider may be operated to provide zero voltage or up to 20 v., the voltage being applied through the slider in opposition to the field potential, and being read by the high resistance voltmeter 70. These voltages mentioned are merely exemplary. Substantially any voltage could be used as long as the charging voltage for the ionization chamber was never discharged below saturation potential.

In operation the switch 63 is closed, shorting the rotor and stator plates of the alternator and reducing the potential difference to zero. The slider 61 being at zero on the compensating potential, the positive side of the field potential 60 is connected to the inner electrode, the outer electrode being already connected to the negative side of the field potential a potential difference of 90 volts is set up between the electrodes, the outer electrode being negative with respect to the inner electrode. The switch is then opened.

The rotor and stator plates being at the same potential and the rotor being rotated, assuming of course, that the amplifier is functioning, there being no potential difference between the plates of the alternator, no current is produced and the indicator M shows no indication.

If the ionization chamber is now placed in X-ray radiation the air is ionized in the chamber and the potential difference between the inner and outer electrode is reduced, which reduction is a function of the amount of radiation and the constants of the chamber.

The device having been submitted to the rays for a length of time and it being desired to know how many Roentgen units have been radiated at the place where the ionization chamber was placed, the ionization chamber is replaced in the unit circuit. Inasmuch as the potential difference has decreased by an unknown amount, the amount of decrease will indicate the amount of radiation. Because of the decrease, we now find the stator plates, which are connected to the inner electrodes are at a different potential than the rotor plates which, being rotated in a field of different potential, generates an alternating current which is amplified, rectified and indicated.

If it is desired now to know the amount of discharge, it is merely necessary to supply a measured potential in opposition with the field potential, and thus reduce the field potential by the amount of the above mentioned reduction in charge or transfer from the outer electrode to the inner electrode. This is accomplished by the compensating potential 68. The slider 61 is moved across the resistance 69 adding voltage in opposition to the field potential 60 until the field potential is reduced an by an amount equal to the number of volts lost in the outer and the inner electrodes. This can be determined by observing the inductor M and ceasing to add compensating voltage when it falls to zero. As soon as the meter M reaches zero, the voltage added is read at the meter 70 which indicates the exact amount added. From this the exact number of Roentgen units may be determined or the meter may be calibrated in Roentgens, giving a direct reading.

In this device it may readily be seen that since the meter M is merely an indicator, that the operation of that part of the circuit after the alternator is not critical because the measurements are dependent only on the elements used in connection with the ionization chamber and alternator.

Having thus described my invention and illustrated the same in certain specific manners in which it may be carried out, I am aware that various changes and modifications will become apparent to those skilled in the art, all of which may be within the scope of the invention, and it is not my intention that the invention be limited to the precise disclosure other than is delineated by the claims hereinafter set forth, and that the claims should be construed with a range of equivalents to which they may be entitled in view of the prior art.

I claim:

1. The method of measuring small electric charges of varying potential which comprises generating an alternating current controlling the generated alternating current by the direct current charge by using the static field of the charge to cause said alternating current to be proportional to the direct current charge, amplifying the alternating current, rectifying the alternating current and measuring the rectified current.

2. In an apparatus for measuring small direct current charges including an ionization circuit adapted to be charged to a predetermined static potential, an alternator connected to said ionization circuit and controlled by the charge in the ionization circuit to provide an alternating current output proportional to the charge in the ionization circuit, an amplifier having an input circuit and an output circuit for amplifying the alternating current, coupling means for coupling the alternator to the amplifier input comprising a tuned circuit approximately resonant to the frequency of the alternator, a rectifier connected to the output of the amplifier and measuring means connected to the rectifier for measuring the rectified current.

3. A circuit of the class described including an ionization circuit adapted to be operated over a predetermined potential range and having an ionization chamber adapted to be inserted in the path of radiations of a generator to cause the gas in said chamber to be ionized, said circuit being operated over said range by said ionization, means for determining the static potential of said circuit including an electrostatic alternator for changing said static potential to an alternating current, and means connected to said alternator for measuring the output thereof.

4. A circuit of the class described including an ionization circuit adapted to be charged to a predetermined potential and having an ionization chamber adapted to be inserted in the path of radiation of a generator to cause the gas in said chamber to be ionized, said circuit being discharged by said ionization, means for determining the static potential of said circuit including an electrostatic alternator for changing said static potential to an alternating current of a value in direct proportion to the static potential, and means connected to said alternator for measuring the output thereof.

5. In a device of the class described, an ionization circuit including an ionization chamber and an electrostatic alternator connected thereto, a control circuit connected to said alternator and including a thermionic amplifier for amplifying the output of the alternator, a rectifier connected to the amplifier and a measuring instrument connected to the rectifier for determining the output thereof.

6. A device of the class described, an ionization circuit and a control circuit, means in the ionization circuit for converting static potential to an approximately harmonically varying alternating current, a thermionic amplifier in the control circuit connected to the ionization circuit for amplifying the alternating current, a rectifier connected to the amplifier for rectifying the alternating current and a meter connected to the rectifier for determining the output thereof.

7. An apparatus of the class described including an ionization circuit, an ionization chamber therefor, means for generating a current varying in ratio to the field potential in the ionization circuit including a condenser having rotor and stator plates, means for rotating the rotor plates, a control and indicator circuit for the ionization circuit including a thermionic amplifier, a rectifier and a meter, said amplifier being coupled to the output of the ionization circuit and having its output connected to the rectifier circuit, said meter being connected to the output of the rectifier circuit.

8. In a device of the class described, an ionization circuit including an ionization chamber and a capacitance connected thereto, means to charge said capacitance to a predetermined potential, means for varying the capacity of said capacitance to cause the potential to vary to provide an oscillatory output, a thermionic amplifier, coupling means for connecting the said ionization circuit to the thermionic amplifier including a tuned circuit tuned for a predetermined frequency response, said thermionic amplifier adapted to amplify said oscillatory current, means for converting said oscillatory current to a direct current comprising full wave rectifier connected to the output of said amplifier, means connected to the output of the rectifier to indicate the potential thereof comprising a meter, and control means connected to and operable by said meter for controlling an independent circuit.

9. In a device of the class described, an ionization circuit including an ionization chamber having electrodes and an electrostatic alternator connected thereto, said ionization circuit adapted to be charged to a predetermined static potential, said alternator adapted to change said static potential to an alternating current, a control circuit including a thermionic amplifier and a tuned circuit connecting said alternator to said amplifier, a rectifier connected to the output of the amplifier for changing the alternating current to a pulsating direct current, and a meter connected to the rectifier for determining the output thereof; a power supply for said control circuit and including means for charging said ionization circuit to a predetermined potential, said meter having a control circuit, a relay for controlling an X-ray machine, said meter control circuit adapted to close said relay to turn off said X-ray machine after the current from the rectifier reaches a predetermined value.

10. In a device for measuring X-rays or the like in combination with an X-ray machine, an ionization circuit including an ionization chamber and an electrostatic alternator, said alternator comprising a variable condenser having stator and rotor plates, means for rotating the rotor plates at a predetermined speed to provide an oscillatory output from the ionization circuit; a control circuit connected to the ionization circuit and including means to charge or discharge the ionization circuit while the rotor plates of the alternator are rotating; an amplifier for amplifying the output of the ionization circuit and a tuned circuit coupling the ionization circuit to the amplifier, a rectifier connected to the output of the amplifier for converting the output to a pulsating direct current, an indicator connected to the rectifier for indicating the output thereof, switch means operable by said indicator and connected to the X-ray machine to shut off the X-ray machine when the potential in the ionization circuit is changed to a predetermined value.

11. In a device of the class described, an ionization circuit including an ionization chamber and electrodes adapted to be charged to a predetermined static potential, an electrostatic alternator including a rotary condenser having segmental stator and rotor plates, said stator plates being connected to said ionization chamber electrodes and supplying an electrostatic field for the rotor plates, means for rotating said rotor plates in said field to generate an alternating current on the rotor proportional to said field strength, a control circuit including a thermionic amplifier, a tuned circuit coupling said alternator to said amplifier, a rectifier circuit for rectifying the output of the amplifier and means operated by the rectified amplifier current including a bridge circuit to indicate the output of the rectifier and to control an extraneous circuit, a meter connected across the bridge circuit and adjustable means to change the reading of the meter and maintain the sensitivity regardless of the change in reading comprising a resistance network forming two legs of the bridge and a compensating resistance adapted to be inserted to maintain the sensitivity.

12. In a device of the character described, an ionization circuit including an ionization chamber and means for changing an electrostatic potential to an alternating current, a control circuit for measuring the output of the ionization circuit and including an amplifier circuit and a rectifier circuit connected in cascade, a measuring instrument connected to the rectifier for measuring the output thereof and having an indicator, a meter circuit, said meter circuit being a bridge circuit with the rectifier connected in one leg thereof and means in one of the other legs of said bridge circuit to change the indicating position of the meter indicator to a predetermined position.

13. In an apparatus of the class described, an ionization circuit, means connected to the ionization circuit to produce an alternating current proportional to the charge in the ionization circuit, an amplifier connected to the alternating current generating means and a meter circuit connected to the amplifier; said meter circuit including a bridge circuit, a rectifier connected in one leg of the bridge circuit and rectifying the current from the amplifier, a potentiometer adjustably disposed in the other leg of the bridge circuit, and a potential source connected to tne potentiometer, a meter disposed across the circuit to indicate the state of balance of said circuit, said potentiometer and said potential source adapted to adjustably supply a potential in opposition to that supplied by the rectifier to change the indication of said meter, means to provide constant bridge circuit sensitivity including a variable resistance mechanically coupled with the potentiometer to compensate for changes in circuit sensitivity simultaneously with changes caused by the changing of the potentiometer.

14. The method of measuring small electric charges or potentials which comprises using a portion of the electric field existing by virtue of the charge to control the generation of an alternating current which is proportional to the charge, and amplifying the alternating current and measuring the amplified alternating current.

15. The method of measuring small electric charges of varying potential which comprises using a portion of the varying electric field existing by virtue of the charge to control the generation of an alternating current which varies in potential in direct proportion to the varying electric field, amplifying said varying alternating current and measuring said alternating current.

16. The method of measuring small electric charges of decreasing potential which comprises using a portion of the decreasing electric field existing by virtue of the charge to control the generation of an alternating current which varies in potential in direct proportion to the varying electric field, amplifying said varying alternating current, and adding a potential equal to the potential lost due to the decrease of the charge and measuring the added potential.

17. In an apparatus of the class described, an ionization circuit adapted to be charged to a predetermined static potential and having an ionization chamber adapted to be inserted in the path of radiation of a radiation generator to cause the gas in the chamber to be ionized, an alternator connected to said ionization chamber for changing the static potential thereof to an alternating current, means for charging the alternator and ionization circuit to a predetermined average value of potential including an impedance of such a high value that a counteracting E. M. F. is added in series with the charging potential so that when the contact is closed the average value of the pulsating direct current in the field of the alternator is almost exactly equivalent to the direct current potential applied.

18. In a device of the class described, an ionization circuit including an ionization chamber having an electrode and an electrostatic alternator connected to said electrode, means to bring said ionization circuit to a predetermined static potential, indicating means connected to said alternator to indicate the output thereof, said ionization chamber adapted to be disposed in the path of ionizing radiation to vary the static charge thereof, and means to add a potential to said ionization circuit equal to the change in the charge due to ionization, the amount of potential necessary to bring the charge to its original status being determined by the indicator in the output of the alternator, and means to measure the amount of potential added.

19. In a device of the class described, an ionization circuit including an ionization chamber and an electrostatic alternator connected thereto, a control circuit connected to the alternator including a thermionic amplifier for amplifying the output thereof, means connected to the amplifier output for indicating the output thereof.

20. An apparatus of the class described, an ionization circuit including an ionization chamber having electrodes, and an electrostatic alternator connected thereto, said ionization circuit adapted to be charged to a predetermined static potential, said alternator adapted to change said static potential to an alternating current, a control circuit including a thermionic amplifier and means connecting said alternator to the amplifier, and means connected to the output of the amplifier to indicate the output including a contact-making mechanism, and means connected thereto for controlling an independent circuit.

21. In an apparatus of the class described, an ionization circuit having electrodes adapted to be charged to a predetermined potential, an electrostatic alternator comprising a rotary variable condenser connected to said electrodes and adapted to generate an alternating current that is proportional to the potential charge of the ionization circuit, a control circuit including a thermionic amplifier connected to the alternator, a rectifier circuit for rectifying the amplifier output, and means operated by the rectified current to indicate the output of the rectifier including a bridge circuit and a meter connected across the bridge, adjustable means to change the meter reading and retain the meter sensitivity regardless of the change in reading including a resistance network comprising two legs of said bridge and a compensating resistance adapted to be inserted to maintain sensitivity.

JOHN A. VICTOREEN.